United States Patent
O'Coin

(10) Patent No.: US 10,240,243 B2
(45) Date of Patent: Mar. 26, 2019

(54) FLOW DISTRIBUTOR HOLE PATTERN

(71) Applicant: Hamilton Sundstrand Corporation, Charlotte, NC (US)

(72) Inventor: James R. O'Coin, Somers, CT (US)

(73) Assignee: Hamilton Sundstrand Corporation, Charlotte, NC (US)

(*) Notice: Subject to any disclaimer, the term of this patent is extended or adjusted under 35 U.S.C. 154(b) by 0 days.

(21) Appl. No.: 15/588,060

(22) Filed: May 5, 2017

(65) Prior Publication Data

US 2018/0320276 A1    Nov. 8, 2018

(51) Int. Cl.
| | |
|---|---|
| C25B 9/00 | (2006.01) |
| C25B 1/26 | (2006.01) |
| C02F 1/46 | (2006.01) |
| C02F 1/461 | (2006.01) |
| C25B 9/06 | (2006.01) |
| C02F 1/00 | (2006.01) |
| C25B 15/08 | (2006.01) |
| C02F 1/467 | (2006.01) |

(52) U.S. Cl.
CPC ............. *C25B 1/26* (2013.01); *C02F 1/006* (2013.01); *C02F 1/4602* (2013.01); *C02F 1/46104* (2013.01); *C25B 9/06* (2013.01); *C25B 15/08* (2013.01); *C02F 1/4674* (2013.01); *C02F 2201/4618* (2013.01)

(58) Field of Classification Search
CPC ... C25B 9/00; C25B 15/08; C25B 1/26; C02F 1/4674; C02F 2201/4611

USPC ........................................................ 204/272
See application file for complete search history.

(56) References Cited

U.S. PATENT DOCUMENTS

| | | |
|---|---|---|
| 6,471,873 B1 | 10/2002 | Greenberg et al. |
| 8,915,307 B2 | 12/2014 | Lelic et al. |
| 2004/0256118 A1* | 12/2004 | Dunster ................. A62C 31/02 169/54 |
| 2018/0009681 A1* | 1/2018 | Cam ........................ C02F 1/463 |

FOREIGN PATENT DOCUMENTS

| | | |
|---|---|---|
| FR | 2961714 | 12/2011 |
| TW | M535598 | 1/2017 |

OTHER PUBLICATIONS

European Patent Office, Partial European Search Report dated Sep. 5, 2018 in Application No. 18155118.5-1101.

* cited by examiner

Primary Examiner — Zulmariam Mendez
(74) Attorney, Agent, or Firm — Snell & Wilmer L.L.P.

(57) ABSTRACT

A flow distributor may comprise an inner surface, an outer surface, and a plurality of holes circumferentially disposed in the flow distributor and extending from the inner surface to the outer surface. Each of the holes may comprise an inlet defined at the inner surface and an outlet defined at the outer surface, wherein each inlet is axially offset from a circumferentially adjacent inlet.

19 Claims, 3 Drawing Sheets

FLOW DISTRIBUTOR HOLE PATTERN

GOVERNMENT LICENSE RIGHTS

This disclosure was made with government support under N00024-13-C-2128 awarded by The United States Navy. The government has certain rights in the disclosure.

FIELD

The disclosure generally relates to a flow distributor, and more particularly to a hole pattern for a flow distributor.

BACKGROUND

A flow distributor may be used to distribute a fluid flow according to various embodiments. For example, with regards to an electrolytic chlorine generator (ECG), a flow distributor may distribute a flow from a tube to an annular flow path defined between an inner electrode and an outer electrode for chlorinating salt water. A plurality of radially extending holes may be disposed in the flow distributor to route the flow to the annular flow path. The ECG may chlorinate the salt water to prevent fouling within a system which uses the salt water, such as for example, a system for a submarine. The flow distributor may experience various loads associated with a submarine.

SUMMARY

A flow distributor is disclosed herein, in accordance with various embodiments. A flow distributor may comprise an inner surface, an outer surface, a first plurality of holes extending from the inner surface to the outer surface, and a second plurality of holes extending from the inner surface to the outer surface, wherein the first plurality of holes are oriented at a first angle with respect to a centerline axis of the flow distributor, and the second plurality of holes are oriented at a second angle with respect to the centerline axis.

In various embodiments, the inner surface may comprise a radially inner surface. The outer surface may comprise a radially outer surface. The inner surface may at least partially define an inlet, whereby a fluid flow is routed to the first plurality of holes and the second plurality of holes. The first plurality of holes may extend from a first axial plane at the outer surface to a second axial plane at the inner surface, the second plurality of holes may extend from the first axial plane at the outer surface to a third axial plane at the inner surface, and the second axial plane and the third axial plane may be axially spaced. The flow distributor may comprise a head portion, wherein the first plurality of holes and the second plurality of holes are disposed, and a tube portion extending from the head portion along the centerline axis and defining the inner surface. The flow distributor may be for an electrolytic chlorine generator (ECG). The head portion may be configured to be coupled to an electrode. The flow distributor may comprise fiberglass.

A flow distributor is disclosed herein, in accordance with various embodiments. A flow distributor may comprise an inner surface, an outer surface, and a plurality of holes circumferentially disposed in the flow distributor and extending from the inner surface to the outer surface, wherein each of the holes comprises an inlet defined at the inner surface and an outlet defined at the outer surface, wherein each inlet is axially offset from a circumferentially adjacent inlet.

In various embodiments, each outlet may be axially aligned with an adjacent outlet. The inner surface may be located radially inward from the outer surface, with respect to a centerline axis of the flow distributor. A fluid flow may be routed from the inner surface to the outer surface via the plurality of holes. The flow distributor may comprise a head portion, wherein the plurality of holes are disposed, and a tube portion extending from the head portion along the centerline axis and defining the inner surface. The flow distributor may be for an electrolytic chlorine generator (ECG). A diameter of each of the holes may be equal.

An electrolytic chlorine generator (ECG) is described herein, in accordance with various embodiments. An ECG may comprise an end housing, an insulator, an outer electrode, an inner electrode, an annular flow path disposed between the outer electrode and the inner electrode, and a flow distributor whereby the annular flow path receives a fluid flow, comprising an inner surface, an outer surface, and a plurality of holes circumferentially disposed in the flow distributor and extending from the inner surface to the outer surface, wherein each of the holes comprises an inlet defined at the inner surface and an outlet defined at the outer surface, wherein each inlet is axially offset from a circumferentially adjacent inlet.

In various embodiments, the end housing may be in contact with the insulator, the insulator may be in contact with the flow distributor, the insulator may be in contact with the outer electrode, the flow distributor may be in contact with the inner electrode, and the flow distributor is in contact with the end housing. The inner electrode, the flow distributor, and the end housing may define a load path, whereby the flow distributor is compressed between the inner electrode and the end housing. The load path may be defined between each inlet.

The foregoing features, elements, steps, or methods may be combined in various combinations without exclusivity, unless expressly indicated herein otherwise. These features, elements, steps, or methods as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

A typical flow distributor for an electrolytic chlorine generator (ECG) may comprise a number of holes circumferentially disposed in the flow distributor having inlets aligned along a common axial plane. In this manner, each of the holes typically intersect each other at an inner surface of the flow distributor. In response to an axial load on the flow distributor, a peak stress may occur at the inner surface of the flow distributor at the location of intersection of the holes.

Various methods may be used to deal with said stress. However, various methods may increase the total weight of the flow distributor and/or may alter flow characteristics of a fluid flow through the flow distributor (e.g., in response to decreasing the diameters of the holes). In this regard, a system is provided herein which reduces peak stress in a flow distributor without substantially altering flow characteristics of a fluid flow through the distributor.

Figure 1:
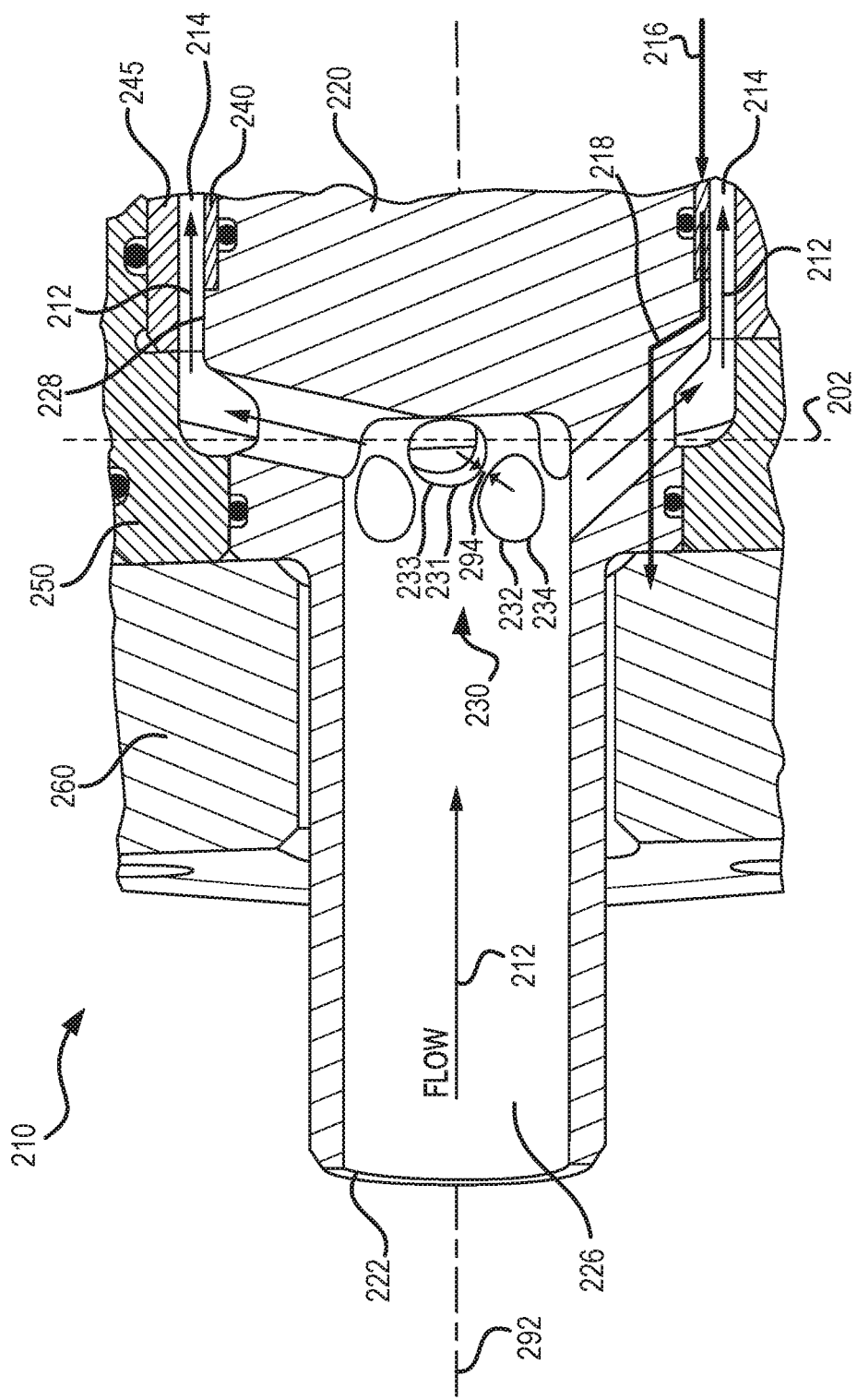
FIG. 1 illustrates a cross-section view of a flow distributor for an ECG, wherein the flow distributor comprises a plurality of holes having axially offset inlets, in accordance with various embodiments.

With reference to FIG. 1, a cross-section view of a flow distributor 220 for an ECG 210 is illustrated, in accordance with various embodiments. ECG 210 may comprise flow distributor 220, inner electrode 240, outer electrode 245, insulator 250, and end housing 260. End housing 260 may be in contact with insulator 250. Insulator 250 may be in contact with flow distributor 220. Insulator 250 may be in contact with outer electrode 245. Flow distributor 220 may be in contact with inner electrode 240. Flow distributor 220 may be in contact with end housing 260.

In various embodiments, inner electrode 240 and outer electrode 245 define an annular flow path 214. ECG 210 may comprise flow distributor 220 for directing a fluid flow 212 from an inlet 222 to annular flow path 214. Flow distributor 220 may comprise a plurality of holes 230 configured to direct fluid flow 212 from inlet 222 to annular flow path 214. In this regard, plurality of holes 230 may route fluid flow 212 from inner surface 226 of flow distributor 220 to outer surface 228 of flow distributor 220. ECG 210 may operate by converting dissolved chloride ions in fluid flow 212 into available chlorine. For example, fluid flow 212 may comprise salt water which may be chlorinated via ECG 210 to prevent fouling in a system which uses fluid flow 212.

In various embodiments, flow distributor 220 may comprise between six and twelve holes 230, and, in various embodiments, flow distributor 220 may comprise nine holes 230. However, flow distributor 220 may comprise any number of holes 230 depending on the size of flow distributor 220 and the desired flow characteristics of fluid flow 212.

In various embodiments, plurality of holes 230 may comprise, for example, first hole 231 and second hole 232. First hole 231 may be circumferentially adjacent to second hole 232. In various embodiments, flow distributor 220 may comprise an inner surface 226 and an outer surface 228. Flow distributor 220 may comprise a centerline axis 292. Inner surface 226 may comprise a radially inner surface. Outer surface 228 may comprise a radially outer surface. First hole 231 and second hole 232 may extend between inner surface 226 and outer surface 228. First hole 231 may comprise a first inlet 233. Second hole 232 may comprise a second inlet 234. First inlet 233 may be axially offset from second inlet 234. In this regard, first inlet 233 may be spaced from second inlet 234. Stated differently, first inlet 233 may be separated from second inlet 234 by a distance 294. In this manner, first inlet 233 does not intersect with second inlet 234. In this manner, first inlet 233 does not share a common edge with second inlet 234.

In various embodiments, first hole 231 may comprise a circular geometry. In various embodiments, second hole 232 may comprise a circular geometry. In various embodiments, the diameter of first hole 231 may be equal to the diameter of second hole 232.

ECG 210 may receive an axial load 216 at inner electrode 240. In various embodiments, axial load 216 may comprise a gravitational or acceleration load, in response to a shock event for example. Axial load 216 may be transmitted from inner electrode 240, through flow distributor 220, to end housing 260, via load path 218. In this regard, inner electrode 240, flow distributor 220, and end housing 260 may define load path 218. Axial load 216 may be transmitted around plurality of holes 230. Flow distributor 220 may be compressed between end housing 260 and inner electrode 240. Because the inlets of plurality of holes 230 are axially offset, material of flow distributor 220 may be increased within axial plane 202 compared to a typical flow distributor. In this regard, peak stress may be reduced in flow distributor 220.

Figure 2:
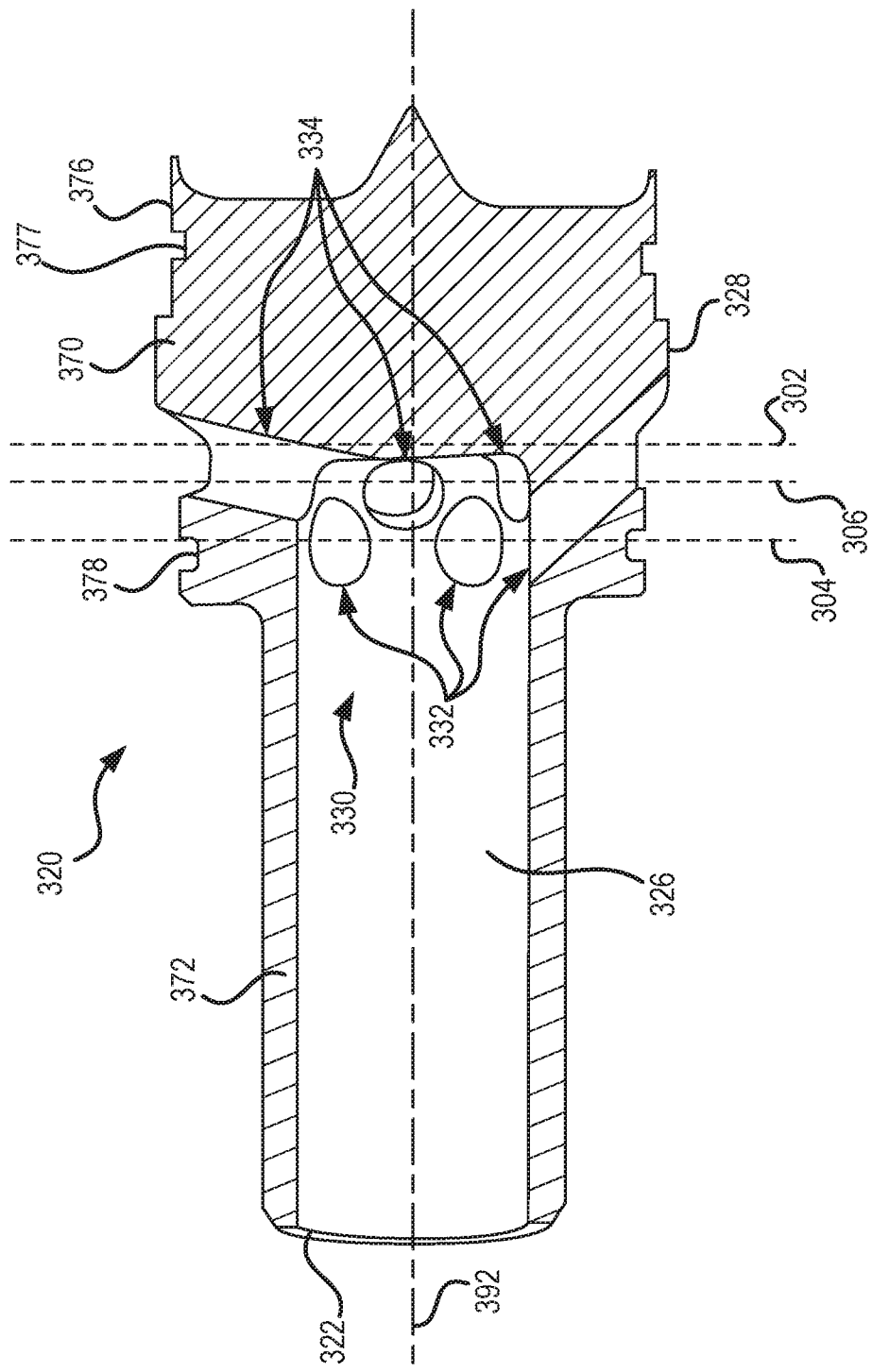
FIG. 2 illustrates a cross-sectional, isolated view of a flow distributor, wherein the flow distributor comprises a first plurality of holes having inlets being axially offset from the inlets of a second plurality of holes, in accordance with various embodiments.

With reference to FIG. 2, an isolated view of a flow distributor 320 is illustrated, in accordance with various embodiments. In various embodiments, flow distributor 220 of FIG. 1 may be similar to flow distributor 320. Flow distributor 320 may comprise a centerline axis 392. Flow distributor 320 may comprise a head portion 370 and a tube portion 372. Tube portion 372 may extend from head portion 370 along centerline axis 392. Tube portion 372 may comprise a cylindrical geometry. Head portion 370 may comprise a cylindrical geometry. Head portion 370 may comprise an outer surface 328. Outer surface 328 may comprise a radially outer surface. Outer surface 328 may comprise a mating face 376 configured to receive an inner electrode. Outer surface 328 may comprise a first channel 377 circumferentially disposed in outer surface 328 and configured to receive a seal. Outer surface 328 may comprise a second channel 378 circumferentially disposed in outer surface 328 and configured to receive a seal.

Flow distributor 320 may comprise an inner surface 326. Inner surface 326 may be located radially inward from outer surface 328 with respect to centerline axis 392. Tube portion 372 may be at least partially defined by inner surface 326. Tube portion may comprise an inlet 322 configured to receive a fluid flow.

Figure 3:
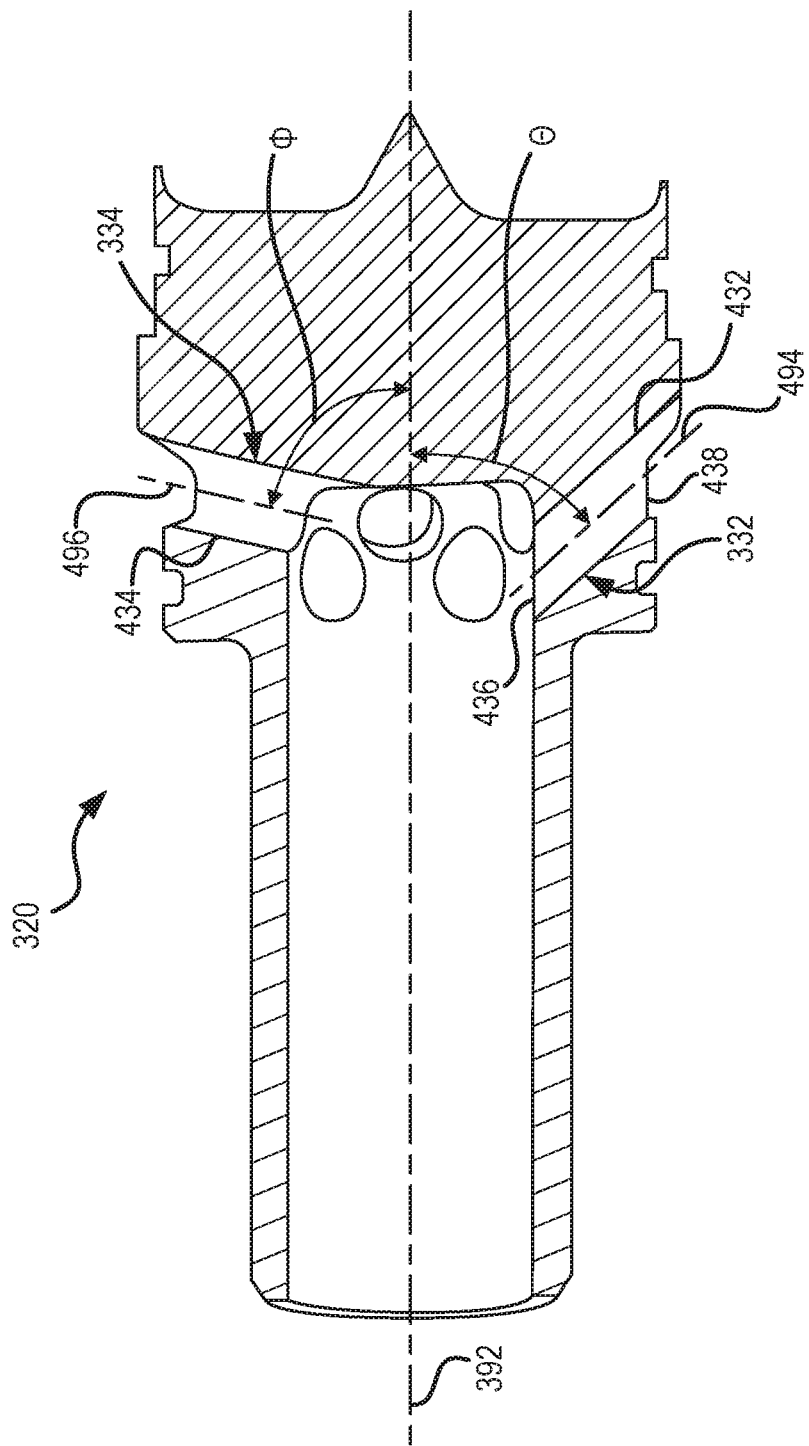
FIG. 3 illustrates the cross-sectional, isolated view of the flow distributor of FIG. 2, wherein the first plurality of holes are oriented at a first angle and the second plurality of holes are oriented at a second angle, in accordance with various embodiments.

In various embodiments, flow distributor 320 may comprise a first plurality of holes 332 extending from inner surface 326 to outer surface 328. Flow distributor 320 may comprise a second plurality of holes 334 extending from inner surface 326 to outer surface 328. With momentary reference to FIG. 3, first plurality of holes 332 may be oriented at a first angle $\Theta$ with respect to centerline axis 392. For example, FIG. 3 illustrates centerline axis 494 of hole 432 oriented at first angle $\Theta$ with respect to centerline axis 392. Second plurality of holes 334 may be oriented at a second angle $\phi$ with respect to centerline axis 392. For example, FIG. 3 illustrates centerline axis 496 of hole 434 oriented at second angle $\phi$ with respect to centerline axis 392. In various embodiments, first angle $\Theta$ may be less than second angle $\phi$. Although described herein with respect to a first plurality of holes oriented at a first angle and a second plurality of holes oriented at a second angle, it is contemplated herein that flow distributor 320 may comprise any number of holes oriented at any number of angles with respect to centerline axis 392 such that each of the holes does not intersect at inner surface 326.

In various embodiments, with combined reference to FIG. 2 and FIG. 3, plurality of holes 330 may each comprise an inlet (e.g., inlet 436) defined at inner surface 326 and an outlet (e.g., outlet 438) defined at outer surface 328. In various embodiments, each outlet 438 may be axially aligned with the axially adjacent outlets.

In various embodiments, with reference to FIG. 2, first plurality of holes 332 may extend from a first axial plane 302 at outer surface 328 to a second axial plane 304 at inner surface 326. In various embodiments, second plurality of holes 334 may extend from first axial plane 302 at outer surface 328 to a third axial plane 306 at inner surface 326. In various embodiments, first axial plane 302 is axially spaced from second axial plane 304. In various embodiments, first axial plane 302 is axially spaced from third axial plane 306. In various embodiments, second axial plane 304 is axially spaced from third axial plane 306.

In various embodiments, a flow distributor 220, as described herein may comprise an insulating material. In various embodiments, flow distributor 220 may be made from fiberglass for example. However, flow distributor 220 may comprise any suitable material including composites, polymers, etc. In various embodiments, inner electrode 240 and outer electrode 245, as described herein, may comprise titanium.

Benefits, other advantages, and solutions to problems have been described herein with regard to specific embodiments. Furthermore, the connecting lines shown in the various figures contained herein are intended to represent various functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A flow distributor comprising:
   an inner surface;
   an outer surface;
   a first plurality of holes extending from the inner surface to the outer surface; and
   a second plurality of holes extending from the inner surface to the outer surface,
   wherein the first plurality of holes are oriented at a first angle with respect to a centerline axis of the flow distributor,
   the second plurality of holes are oriented at a second angle with respect to the centerline axis, and
   the first plurality of holes extend from a first plane at the outer surface to a second plane at the inner surface;
   the second plurality of holes extend from the first plane at the outer surface to a third plane at the inner surface, and
   the second plane and the third plane are axially spaced, the first plane, the second plane, and the third plane are oriented perpendicular to the centerline axis.

2. The flow distributor of claim 1, wherein the inner surface comprises a radially inner surface.

3. The flow distributor of claim 2, wherein the outer surface comprises a radially outer surface.

4. The flow distributor of claim 3, wherein the inner surface at least partially defines an inlet, whereby a fluid flow is routed to the first plurality of holes and the second plurality of holes.

5. The flow distributor of claim 1, wherein the flow distributor comprises:
   a head portion, wherein the first plurality of holes and the second plurality of holes are disposed; and
   a tube portion extending from the head portion along the centerline axis and defining the inner surface.

6. The flow distributor of claim 5, wherein the flow distributor is for an electrolytic chlorine generator (ECG).

7. The flow distributor of claim 6, wherein the head portion is configured to be coupled to an electrode.

8. The flow distributor of claim 6, wherein the flow distributor comprises fiberglass.

9. A flow distributor comprising:
an inner surface;
an outer surface; and
a plurality of holes circumferentially disposed in the flow distributor and extending from the inner surface to the outer surface,
wherein each of the holes comprises:
an inlet defined at the inner surface; and
an outlet defined at the outer surface;
wherein each inlet is axially offset from a circumferentially adjacent inlet.

10. The flow distributor of claim 9, wherein each outlet is axially aligned with an adjacent outlet.

11. The flow distributor of claim 9, wherein the inner surface is located radially inward from the outer surface, with respect to a centerline axis of the flow distributor.

12. The flow distributor of claim 11, wherein a fluid flow is routed from the inner surface to the outer surface via the plurality of holes.

13. The flow distributor of claim 12, wherein the flow distributor comprises:
a head portion, wherein the plurality of holes are disposed; and
a tube portion extending from the head portion along the centerline axis and defining the inner surface.

14. The flow distributor of claim 13, wherein the flow distributor is for an electrolytic chlorine generator (ECG).

15. The flow distributor of claim 14, wherein a diameter of each of the holes is equal.

16. An electrolytic chlorine generator (ECG), comprising:
an end housing;
an insulator;
an outer electrode;
an inner electrode;
an annular flow path disposed between the outer electrode and the inner electrode; and
a flow distributor whereby the annular flow path receives a fluid flow, comprising:
an inner surface;
an outer surface; and
a plurality of holes circumferentially disposed in the flow distributor and extending from the inner surface to the outer surface,
wherein each of the holes comprises:
an inlet defined at the inner surface; and
an outlet defined at the outer surface;
wherein each inlet is axially offset from a circumferentially adjacent inlet.

17. The ECG of claim 16, wherein
the end housing is in contact with the insulator;
the insulator is in contact with the flow distributor;
the insulator is in contact with the outer electrode;
the flow distributor is in contact with the inner electrode; and
the flow distributor is in contact with the end housing.

18. The ECG of claim 17, wherein the inner electrode, the flow distributor, and the end housing define a load path, whereby the flow distributor is compressed between the inner electrode and the end housing.

19. The ECG of claim 18, wherein the load path is defined between each inlet.

* * * * *